US010944480B2

United States Patent
Jensen et al.

(10) Patent No.: US 10,944,480 B2
(45) Date of Patent: *Mar. 9, 2021

(54) OPTICAL COMMUNICATION SYSTEMS, DEVICES, AND METHODS INCLUDING HIGH PERFORMANCE OPTICAL RECEIVERS

(71) Applicant: Bifrost Communications ApS, Kongens Lyngby (DK)

(72) Inventors: Jesper Bevensee Jensen, Albertslund (DK); Bo Pedersen, Kastrup (DK)

(73) Assignee: Bifrost Communications ApS, Kongens Lyngby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,514

(22) Filed: Feb. 17, 2020

(65) Prior Publication Data

US 2020/0186257 A1 Jun. 11, 2020

Related U.S. Application Data

(60) Continuation of application No. 16/459,604, filed on Jul. 1, 2019, now Pat. No. 10,608,747, which is a
(Continued)

(51) Int. Cl.
*H04B 10/60* (2013.01)
*H04B 10/61* (2013.01)
*H04B 10/54* (2013.01)

(52) U.S. Cl.
CPC ............ *H04B 10/60* (2013.01); *H04B 10/54* (2013.01); *H04B 10/612* (2013.01); *H04B 10/614* (2013.01); *H04B 10/6164* (2013.01)

(58) Field of Classification Search
CPC ...... H04B 10/60; H04B 10/54; H04B 10/612; H04B 10/614; H04B 10/6164
See application file for complete search history.

(56) References Cited

U.S. PATENT DOCUMENTS 6,222,861 B1 4/2001 Kuo et al.
7,027,743 B1 * 4/2006 Tucker ................ H04B 10/60
356/484
(Continued)

OTHER PUBLICATIONS

Enning B et al : "Signal processing in an optical polarization diversity receiver for 560-Mbi t/s ASK heterodyne detection", Journal of Lightwave Technology, IEEE Service Center, New York, NY, US, vol. 7, No. 3, Mar. 1, 1989 (Mar. 1, 1989), pp. 459-464, XP011479323, ISSN: 0733-8724, DOI: 10.1109/50.16881.

*Primary Examiner* — Mina M Shalaby
(74) *Attorney, Agent, or Firm* — Law Office Of Michael Antone; Michael Antone

(57) ABSTRACT

The present invention relates to communication systems, devices, and methods for providing for a wide bandwidth optical receiver including amplification through optical beating from a local oscillator laser operating without a phase-locked loop at frequency near the receiver optical signal and decreasing the system-performances dependence on optical polarization alignment between the signal and the local oscillator. Systems, devices, and methods including a local oscillator providing a local oscillator signal having a local oscillator frequency that may be controlled based on a frequency offset from the signal center frequency through the use of monitoring signals representative of the frequency offset. A combiner/splitter couples the optical data signal with light from the local oscillator to provide first and second coupled optical signals with orthogonal polarization. Two opto-electrical converters for converting first and second coupled signals into first and second electrical signals. The first and second electrical signals are individually rectified and then combined to provide the electrical data signal. The opto-electronic converters and rectifiers may have a bandwidth substantially similar the wavelength channel bandwidth to enable the optical receiver to receive
(Continued)

optical signal with different center frequencies within the wavelength channel.

19 Claims, 12 Drawing Sheets

Related U.S. Application Data division of application No. 15/927,792, filed on Mar. 21, 2018, now Pat. No. 10,367,588.

(60) Provisional application No. 62/474,599, filed on Mar. 21, 2017.

(56) References Cited

U.S. PATENT DOCUMENTS

| | | | | |
|---|---|---|---|---|
| 10,367,588 B2* | 7/2019 | Jensen | ............... | H04B 10/60 |
| 2009/0202243 A1* | 8/2009 | Qian | ............... | H04B 10/61 398/65 |
| 2010/0254718 A1* | 10/2010 | Oda | ............... | H04B 10/60 398/202 |
| 2011/0150504 A1* | 6/2011 | Ellis | ............... | H04B 10/60 398/203 |
| 2011/0234435 A1* | 9/2011 | Woodward | ............ | H03M 1/124 341/137 |
| 2013/0064545 A1* | 3/2013 | Sun | ............... | H04J 14/0232 398/70 |
| 2013/0215805 A1* | 8/2013 | Hong | ............... | H04B 15/00 370/281 |
| 2013/0302029 A1* | 11/2013 | Lee | ............... | H04B 10/07 398/25 |
| 2014/0169501 A1* | 6/2014 | Nazarathy | ......... | H03H 17/0266 375/316 |
| 2015/0063818 A1* | 3/2015 | Zhou | ............... | H04B 10/516 398/115 |
| 2015/0256266 A1* | 9/2015 | Duthel | ............ | H04B 10/07955 398/38 |
| 2015/0280856 A1* | 10/2015 | Nakashima | ......... | H04B 10/614 398/65 |
| 2019/0372675 A1* | 12/2019 | Jensen | ............... | H04B 10/6164 |

* cited by examiner

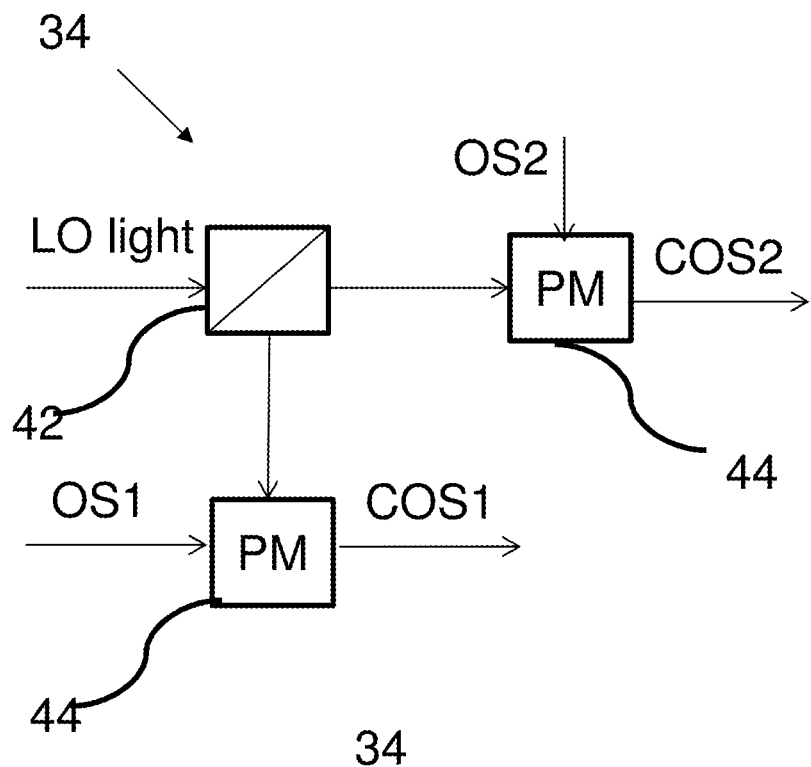
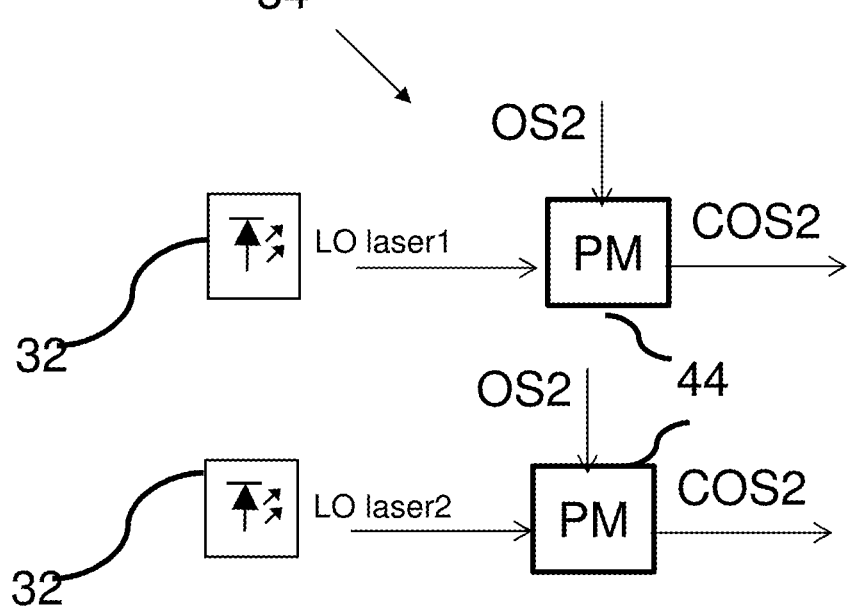
FIG. 6
FIG. 7

OPTICAL COMMUNICATION SYSTEMS, DEVICES, AND METHODS INCLUDING HIGH PERFORMANCE OPTICAL RECEIVERS

CROSS-REFERENCE TO RELATED APPLICATIONS

The application is a continuation of U.S. patent application Ser. No. 16/459,604 filed on Jul. 1, 2019, which is a divisional application of U.S. patent application Ser. No. 15/927,792 filed on Mar. 21, 2018, now U.S. Pat. No. 10,367,588 issued Jul. 30, 2019, which claims priority to and the benefit of U.S. Provisional Patent Application Ser. No. 62/474,599 filed Mar. 21, 2017, all of which are incorporated herein by reference in their entireties.

BACKGROUND OF THE INVENTION

Field of the Invention

The present invention generally relates to optical communication systems and receivers with improved performance. More specifically, the invention relates to optical communication systems and optical receivers that employ local oscillators to provide improved receiver and system performance for coherent and non-coherent systems.

Background Art

A communication system involves sending of information between a sender and receiver. The generation, transmission, reception of signals carrying the information is extremely important for society. In optical communication systems, the efficiency of the system in carrying information is related to the ability to control optical and electrical performance of the equipment in the system. For example, when directly modulated lasers are used, frequency chirping may often occur causing the optical wavelength (or frequency) to be dependent on the optical power.

Various solutions, such as low line width lasers and external modulators, while effective increase the cost of the optical system. Co-pending U.S. patent application Ser. No. 15/117,048, which is incorporated herein by reference in its entirety, provides another option of using local oscillators and optical-electrical converters in receivers and systems that enable the use of a wider range of components and conditions.

However, there remains is a continuing need for optical communications systems with lower cost and higher performance. This need is particularly acute in metro and access networks, where high performance systems are not financially feasible.

BRIEF SUMMARY OF THE INVENTION

The present invention addresses the above noted needs by providing communication systems, devices, and methods that involve controlling a local oscillator laser frequency in an optical signal detection system, decreasing the system-performance dependence on optical polarization, and/or enabling optical signal detection over a wide bandwidth for AM, FM, and combined AM/FM signals that employ various modulation formats including two or more levels, such as 0/1, duobinary, and other multi-level, advanced formats.

Optical systems of the present invention include optical receivers that may include:

- one or more local oscillators, each providing light at a local oscillator frequency;
- at least one coupling device to couple the encoded optical signal with the light from the local oscillators into a combined optical signal;
- a polarizing beam splitter/combiner to split the encoded optical signal and possibly the LO light into orthogonally polarized combined signals;
- two or more opto-electrical converters having a predefined frequency bandwidth, to provide a corresponding two or more encoded signal currents where one type of states may have a higher oscillation frequency than another type of states;
- two rectifiers (e.g., envelope detectors) to rectify the first and second electrical signals and provide first and second rectified electrical signals; and
- a combiner to combine the first and second rectified electrical signals.

In various embodiments, the local oscillator frequency-offset is selected to be dependent on said frequency bandwidth and controlled without the use of a phase locked loop by monitoring the electrical characteristics of the signals.

In various embodiments, the optical system employs one receiver to receive signals from a plurality of optical transmitters in TDM, WDM, & TWDM systems, wherein the optical receivers include the opto-electrical converters have a bandwidth that is substantial larger than the bit rate and optical signal bandwidth and account for frequency chirp, burst-mode spectral excursion, temperature, aging, e.g., photodiodes and rectifiers have a 40 GHz bandwidth for a 10 Gbps bit rate signal. The local oscillator is controlled to enable efficient reception of signal with the bandwidth of the receiver over one or more wavelength channels in passive optical network and amplified systems.

Accordingly, the present disclosure addresses the continuing need for systems and receivers with improved cost and performance.

BRIEF DESCRIPTION OF THE DRAWINGS

The accompanying drawings are included for the purpose of exemplary illustration of various aspects of the present invention, and not for purposes of limiting the invention, wherein:

FIGS. 6 and 7 show exemplary combiner and local oscillator embodiments.

Figure 1:
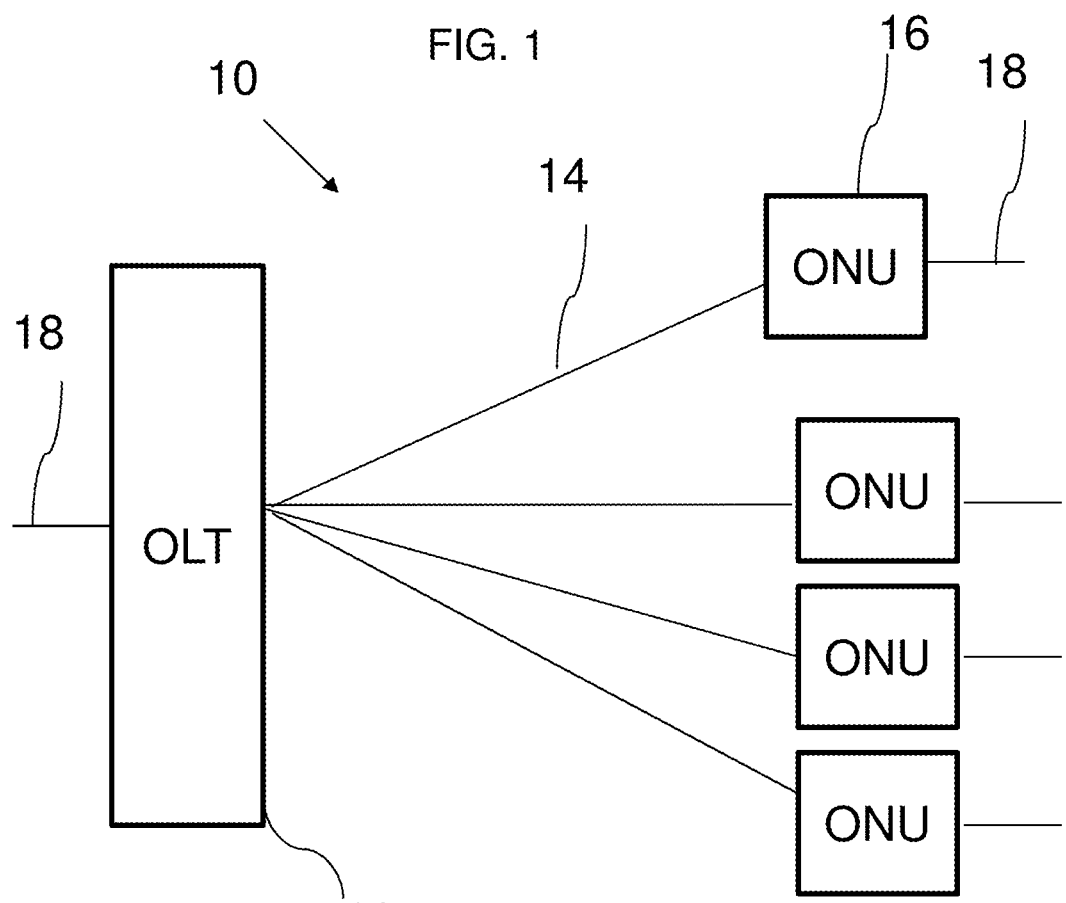
FIGS. 1 & 2 show exemplary optical systems embodiments.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Optical systems 10 of the present invention may be employed in various known configurations in uni- or bi-directional systems that may be point or multi-point to point or multi-point configurations with nodes deployed in linear, ring, mesh, and other network topologies. In general, the system 10 may be deployed using free space and/or optical fiber, but it may be appreciated that many of the applications may involve fiber optic-based system.

Furthermore, the optical system 10 may generally support one or more wavelength channels that may be laid out in a channel grid over various ranges in the optical spectrum. For example, single channel system may be operated with a wavelength channel around 1310 nm and/or 1550 nm. While dense wavelength division multiplexed (DWDM) systems, for example, may divide the optical spectrum ranging nominally from 1490-1625 nm (S-band, C-band, L-band) into dozens of wavelength channels having a fixed or variable bandwidths, such as 50 GHz, 100 GHz, etc., depending upon the design and application of the system 10. For example, the system may be defined with wavelength channels based on the ITU grid, https://www.itu.int/itu-t/recommendations/rec.aspx?rec=11482. Optical signals may be transmitted through the system 10 at wavelengths that fall within one of the wavelength channel. While the channel grid may be continuous with adjacent channels sharing a channel edge, the system 10 may provide a guard band near the channel edge. The guard band is a wavelength range that is adjacent to the channel edge in which optical signals should not be transmitted used to reduce the amount of interference between signals in adjacent channels.

Figure 2:
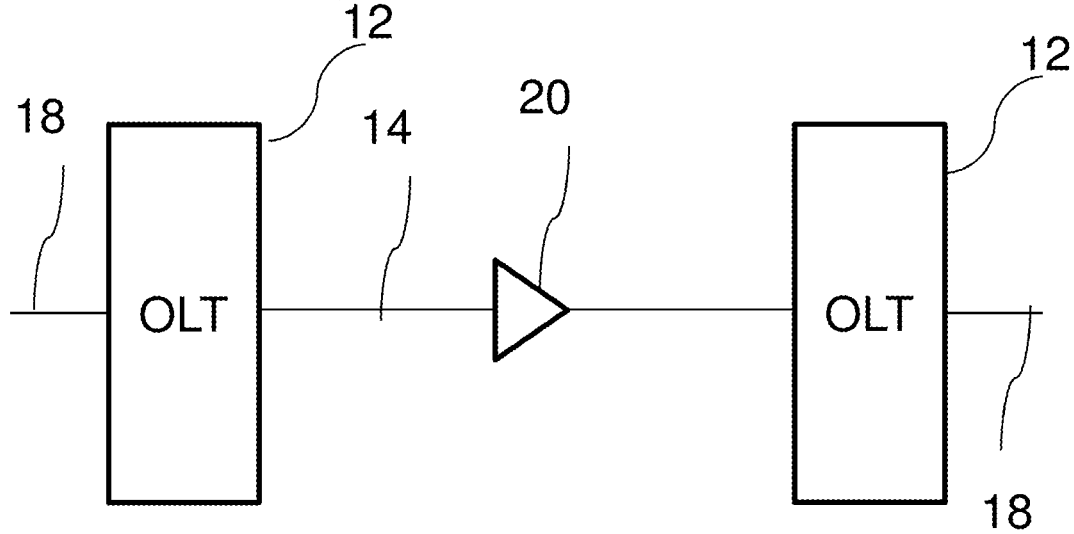

FIGS. 1 & 2 depict exemplary embodiments of optical system 10 in point to multi-point links (1) and point to point links (2) between nodes. The links may be stand-alone optical communication links or may be part of a larger network as described in the preceding paragraph that may include optical switches, add/drop multiplexers (OADM), optical amplifiers (OA), etc.

In FIG. 1, exemplary optical system 10 embodiments may include an optical line terminal or regenerator (OLT) 12. The OLT 12 may be in uni- or bi-directional optical communication via one or more optical fibers 14 with one or more optical network units (ONU) 16. The OLTs 12 and ONUs 16 may be connected to one or more input/output lines 18, which may be optical and/or electrical depending upon the network implementation.

FIG. 2 shows exemplary optical system 10 embodiments including a point to point link between two OLTs 12. FIGS. 1 and 2 embodiments may or may not include optical amplifiers 20 depending upon the network configuration.

FIGS. 1 and 2 embodiments may be deployed in various layers in the network including the metro and access layers of the network. In the access networks including fronthaul, backhaul and aggregation, the system 10 may be operated as passive optical network ("PON") or may include line amplifiers 20 to provide amplification between the nodes.

Figure 3:
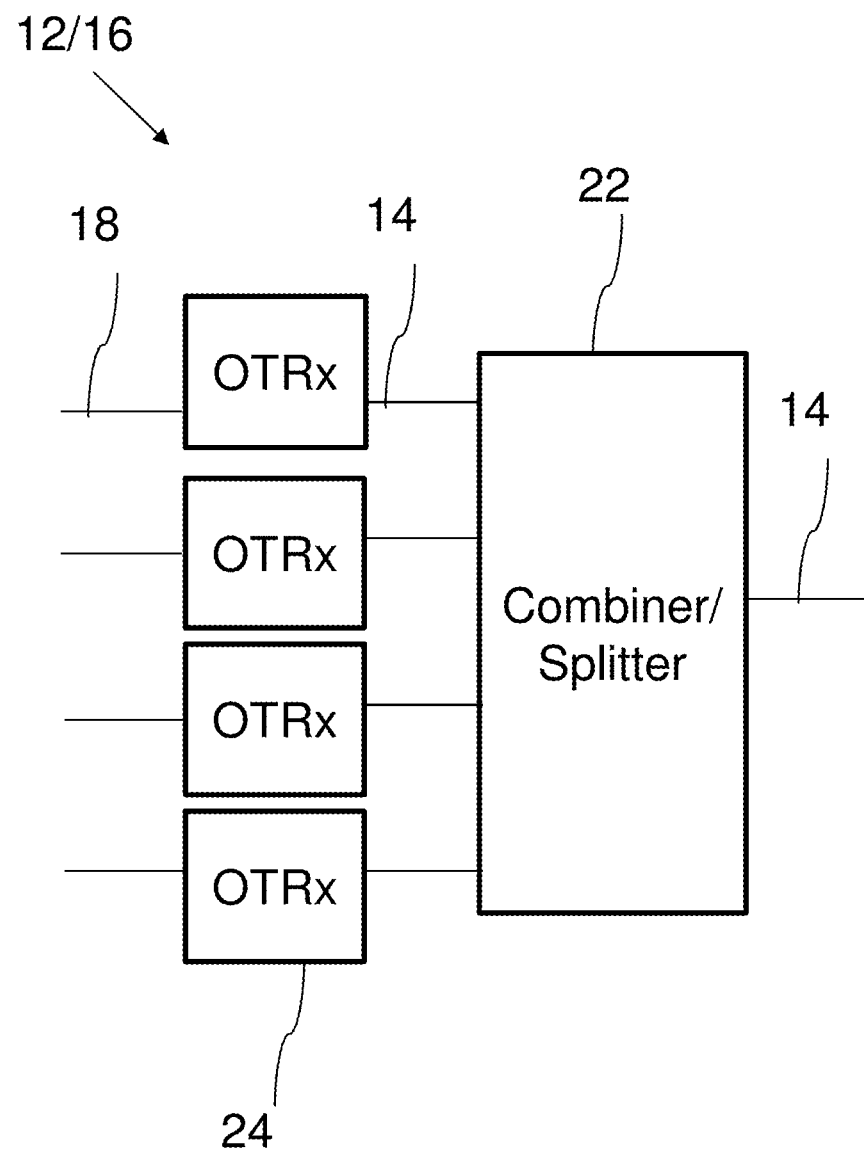
FIG. 3 shows exemplary optical line terminal/regenerator embodiments.

FIG. 3 shows exemplary OLT 12 and ONU 16 node embodiments that may include an optical combiner/splitter 22 that may combine and/or split optical signals when more than one transmitter or receiver, (OTRx) 24 is used in the system 10.

The optical combiner/splitter 22 may include passive couplers and wavelength specific multiplexers and demultiplexers depending upon whether the optical system is deployed as a single wavelength and/or wavelength division multiplexed system. For example, the optical system 10 may be deployed as a time division multiplexed ("TDM"), wavelength division multiplexed ("WDM"), or time & wavelength division multiplexed ("TWDM") system in which each ONU 16 communicating with the OLT 12 may use the same or different wavelengths as will be further described herein. It will be appreciated that if a node in the system is only transmitting and/or receiving one channel and only one channel is present on the fiber link 14 connecting the nodes, then optical combiner/splitter 22 may be used in the nodes.

The transmitter or receiver (OTRx) 24 may include only transmitters or receivers, separate transmitters and receivers, or transceivers depending up the system configuration. In various embodiments, it may be cost effective to employ integrated transceivers to reduce cost, but in other embodiments it may be more desirable to employ separate transmitters and receivers, as well as to merely provide for uni-directional communication.

The optical transmitter in the OTRx 24 generally include one or more fixed or tunable wavelength optical sources, such as narrow or broad line width lasers. Information in one or more information streams may be imparted to the light, i.e., optical carrier, emitted by the source directly modulating the source, modulating the light using an external modulator, and/or upconverting electrical carriers carrying the information to producing the optical signal carrying the information on one or more wavelengths/frequencies.

The information may be imparted using one or more modulation techniques including amplitude modulation (AM), frequency modulation (FM), or combined AM and FM. In addition, the information may be imparted in analog or digital format employing various modulation formats that support two or more modulation levels, e.g., "0"-states and "1" states, RZ, NRZ, etc. Advanced/higher-order/multilevel modulation formats, such as duobinary and other higher order constellations, may be used to enable more bits of information per symbol transmitted, or to allow for the use of components with a bandwidth smaller than the equivalent binary signal bandwidth. For example, a system employing four amplitude levels will be able to encode two bits per symbol, a system employing four frequency levels will be able to encode two bits per symbol, a system which independently employs four amplitude and four frequency levels will be able to encode four bits per symbol, and a duobinary or higher order other partial response system will be able to encode one or more bits per symbol using a reduced frequency spectrum. Apart from amplitude and frequency, the information may also be encoded in the phase of the carrier, in the polarization of the carrier, as variations in pulse-width or as variations in pulse position.

It will be further appreciated that the additional signal processing, such as forward error correction (FEC), may be performed in the information before transmission as an optical signal. In various embodiments, error correction and/or testers may be used to provide feedback to control various transmitters and receivers in the system 10.

In various embodiments, the signal may be encoded by one or more simultaneous AM and/or FM devices, such as frequency chirped lasers, directly modulated laser (DML), externally modulated laser (EML), vertical cavity surface emitting laser (VCSEL), etc. Both DMLs and VCSELs have a broad linewidth and are generally low cost. In various embodiments, pure AM may be used for signal modulation through the use an external modulator with a wide variety of lasers, as are known in the art.

Regardless of how the AM and/or FM signal is generated, the frequency modulation is responsible for the different states are converted to different frequencies, whereas the amplitude modulation is responsible for separating the different states in amplitude, thereby conveniently supplying further information of the different states as conventional systems do not include.

The different frequencies, i.e., the different states, are separated by a frequency separation, also called a FM shift. Thus, the FM shift is defined as the frequency separation between the two states of the frequency modulated (FM) signal. As an example, the FM shift is the difference between the "0"-states and the "1"-state of the combined AM-FM signal, i.e., the optical signal.

Figure 4:
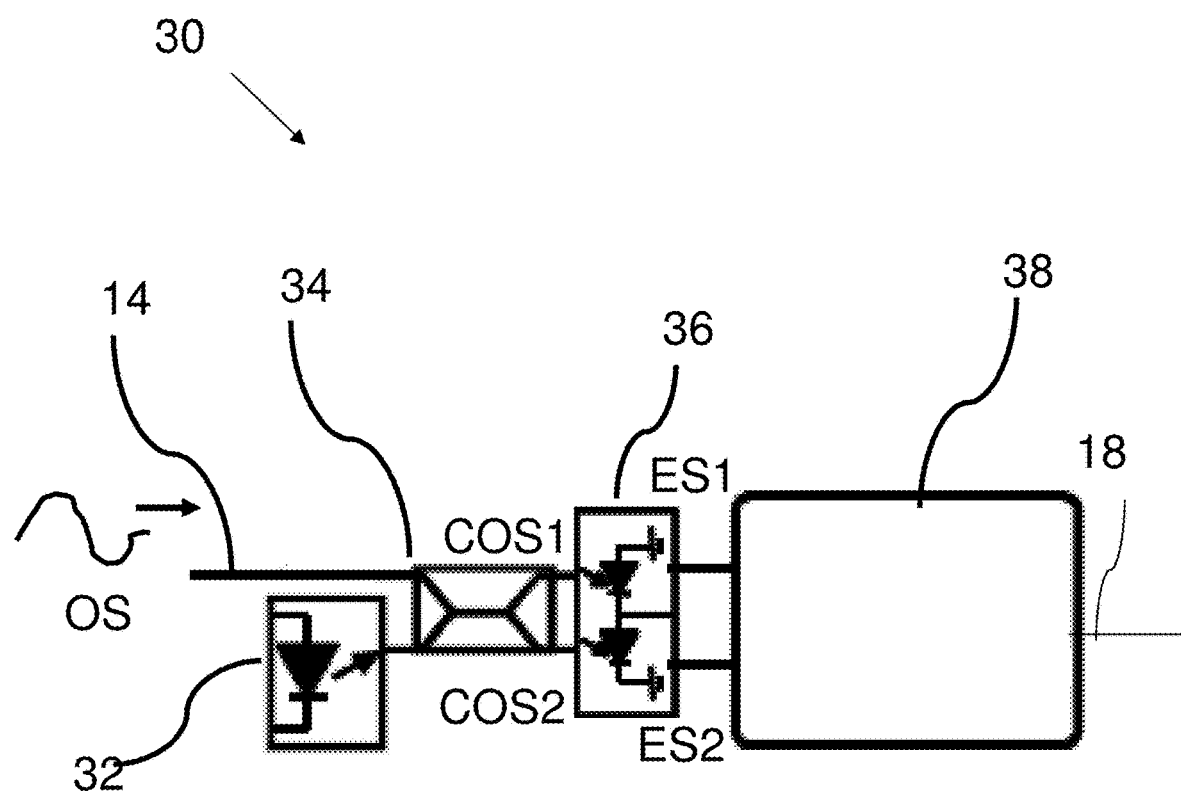
FIGS. 4, 5, 9, 10, and 12 show exemplary optical receiver embodiments.

FIG. 4 shows exemplary embodiments of optical receivers 30 that may be employed in the OTRx 24 separate from the optical transmitter or as part of a transceiver. It will be appreciated that other optical receivers in the optical system 10 may be different from the embodiments shown in FIG. 4.

The optical receiver 30 generally may include one or more fixed or tunable local oscillator ("LO") optical sources 32, such as lasers of various linewidths, to provide LO light at one or more local oscillator frequencies, which may offset from the frequency of the optical signal, i.e., the LO frequency offset. The optical local oscillator laser (LO) emitting light at an optical frequency (Flo) which is offset from the signal center frequency (Fc) by frequency-offset, or frequency difference, (dF).

A combiner/splitter 34 combines an incoming optical signal with the LO light and outputs at least two combined optical signals, e.g., COS1 & COS2 to a corresponding number of optical-to-electrical (OE) converters 36, such as photodiodes. For example, a 2×2 PM coupler may be used or separate combiners and splitters. The OE converters 36 output corresponding electrical signals at the frequency of the LO frequency offset, e.g., ES1 & ES2. The corresponding electrical signals may be provided to electrical processing unit 38 that may rectify and output the information as an electrical signal on output line 18 for further signal processing in the receiver and/or further transmission in or out of the system 10.

Figure 5:
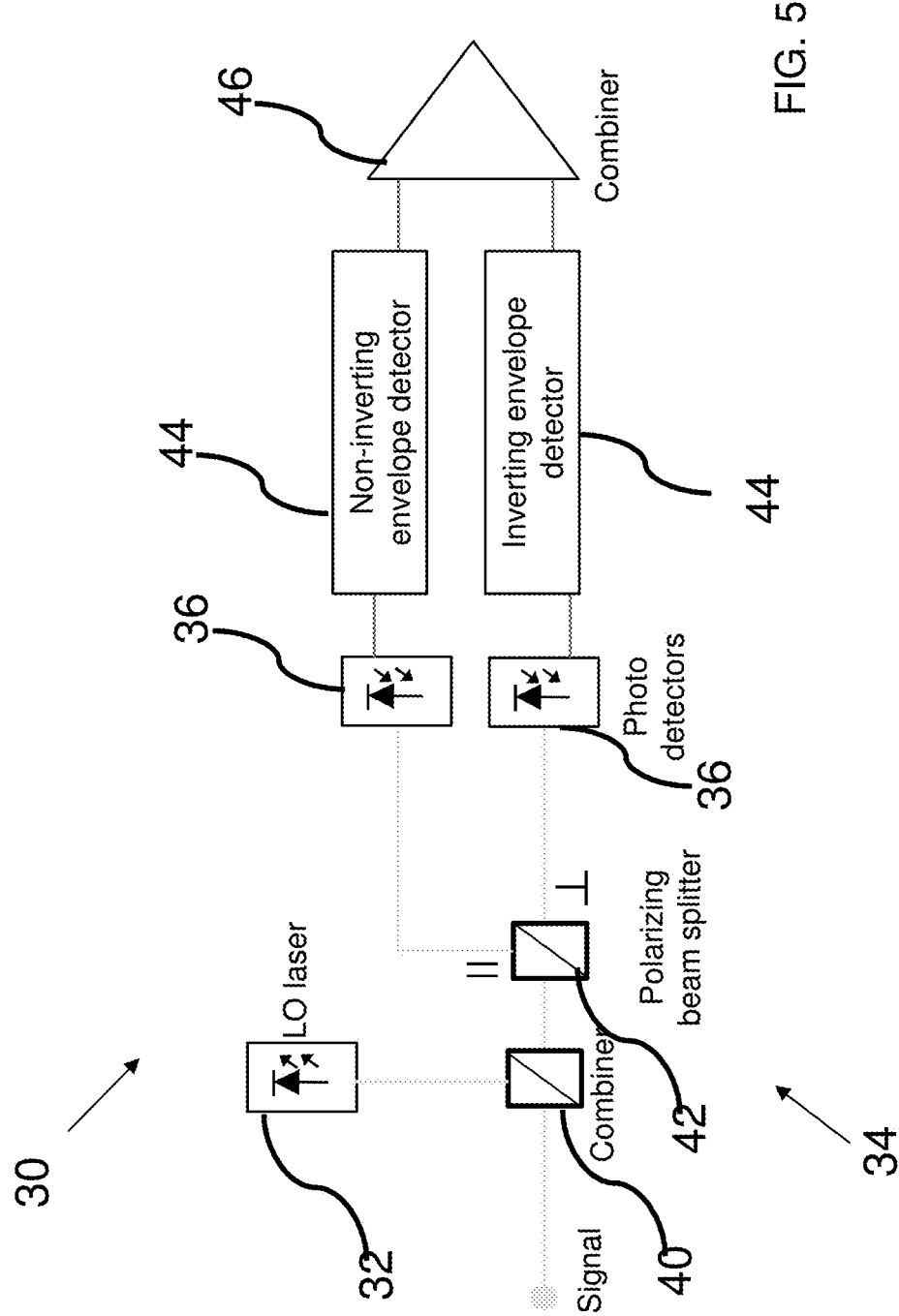

FIG. 5 shows various embodiments optical receiver 30 embodiments in which the combiner/splitter 34 may be provided as separate combiners 40 and splitters 42 in the receiver 30.

The combiner 40 may be provided as a passive coupler, such as a 50/50 coupler, but other combining ratios may be employed. The splitter 42 may be a polarization beam splitter (PBS) to split the combined optical signal provided by the coupler 38 into orthogonally polarized combined optical signals. In each axis, the optical data signal and the LO signal are therefore polarization aligned. Given the unknown polarization of the incoming optical signal, the detected signals need to be combined after photodetection to fully recover the information carried by the incoming optical signal.

The optical signal power distributed between the two output branches of the PBS 42 may or may not be equal, because the polarization orientation of the incoming optical signal may not be known. In various embodiments in which the polarization of the incoming optical signal is known, then the combiner 40 may be a polarization combiner and the polarization of the LO light and optical signal may be combined in a known manner, so the combined optical signal (incoming signal and LO light) may be split between the polarization in a 50/50 or other ratio as desired by one of ordinary skill.

In various embodiments, the polarization of the LO light is oriented at 45 degrees between the principle angles of the PBS in order to distribute the LO power evenly between the two arms of the PBS. As the polarization of the signal varies, the signal power will be distributed accordingly between the two arms. The outputs of the two photodiodes will therefore vary in the same way. When the signal is completely aligned along one arm, this PD will have high output around the offset frequency dF and the other arm will have zero output around dF. When the signal is evenly distributed between the two arms, the PD outputs around dF are equal. By combining the two outputs, the system's overall dependence of the polarization of the incoming signal has been reduced.

In various embodiments, such as shown in FIGS. 6 & 7, the LO light may be combined with the incoming optical signal after the optical signal is split using the polarization beam splitter 42 into two optical signals, OS1 and OS2 using another PBS 42. The combining may be performed using polarization maintaining combiners 44. Polarization maintaining fiber may be used between LO 32, the polarization splitter 42, and polarization combiners 44 to control the distribution of LO light between the coupled optical signals. While it may be desirable to provide substantially similar amounts of LO light to each optical signal, one of ordinary may vary the relative amounts provided.

FIG. 6 show embodiments in which LO light from one LO source 32 may be split using polarization beam splitter 42 in a 50/50 ratio or other ratios as desired, then split LO light is combined with the optical signals OS1 and OS2 that were split using a second (not shown) polarization beam splitter 42.

Figure 8:
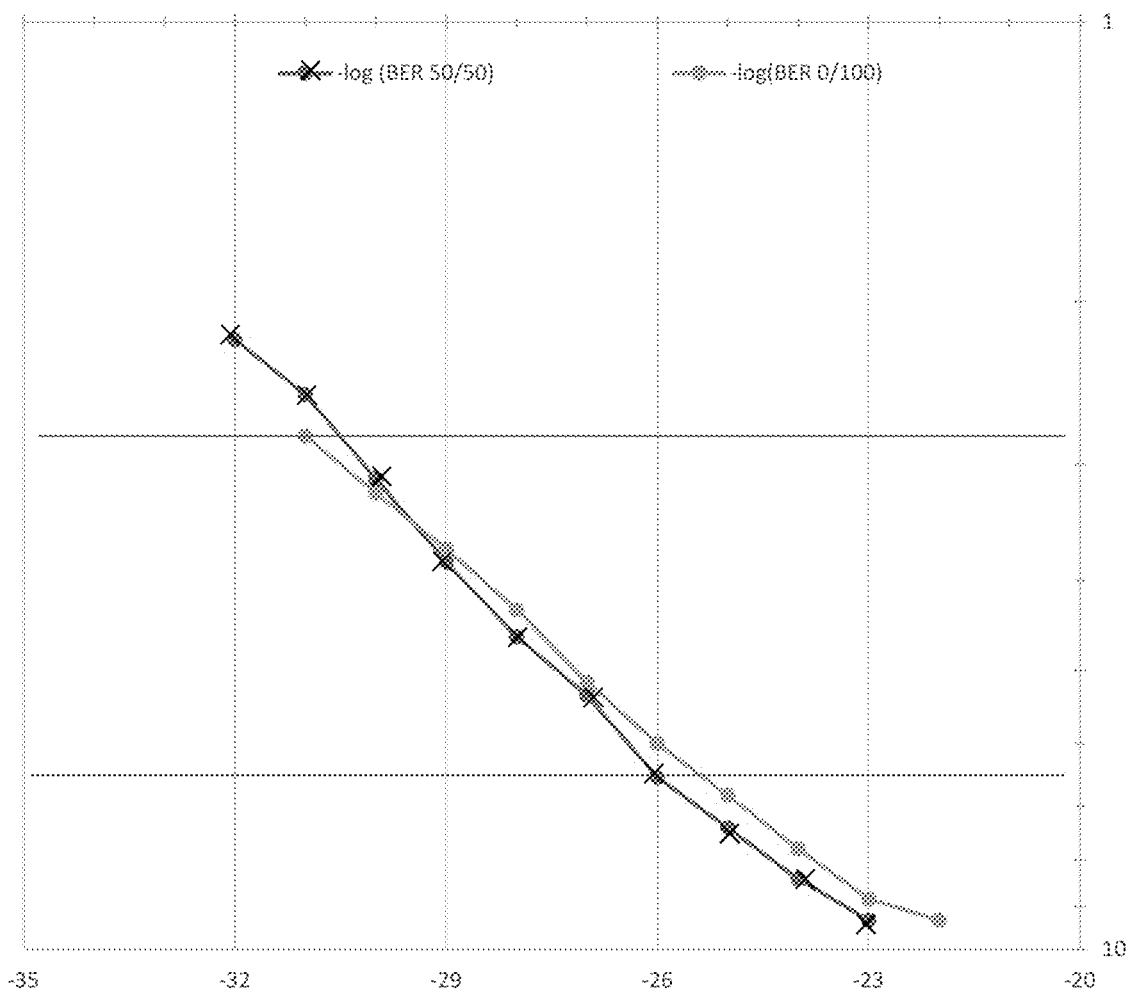
FIGS. 8, 11, and 14 show exemplary performance data.

FIG. 7 show embodiments in which LO light from two or more LO sources 32 may be combined with the optical signals OS1 and OS2 that were split using the polarization beam splitter 42. It will be appreciated that the LO light from the two or more LO sources 32 may be separately combined with the split optical signals as shown or the LO light may be combined and then split as in FIG. 6 before combining with the optical signals FIG. 8 show a plot of the −log(BER) vs receiver input power with polarization aligned to one arm (0/100—orange) or aligned halfway between the two arms (50/50—red) using an embodiment of the receiver 30, such as those shown in FIG. 5. Nearly identical performance is observed.

Other ways to obtain polarization independence may be to use polarization scrambling and automatic or manual adaptive polarization control.

In various embodiments, the local oscillator(s) 32 may be a cooled or uncooled laser, such as a VCSEL, DFB, DBR, ECL or other type of laser. The local oscillator 32 may be tuned to a frequency or a wavelength of the signal. This can either be an in-band or an out-of-band configuration. In an in-band configuration, the LO is tuned to a frequency or wavelength within a spectrum of the signal. In an out-of-band configuration, the LO 32 is tuned to a frequency or wavelength outside a spectrum of the signal. In this way, wavelength selectivity may be achieved using the local oscillator 32. Using the local oscillator 32 as a wavelength selector enables the system to operate with or without optical filters.

By tuning the local oscillator 32 to a frequency, where one type of state is located, the state may be up-converted to a frequency which may be lower than another up-converted state. The signal may in general be up-converted to a frequency which is equal to the instantaneous frequency difference between that of the signal and the LO 32. In some embodiments, the tuning may be system dependent; in particular the tuning may be dependent on the temperature. Thus, a tuning to a given state may include tuning the LO 32 to frequency or wavelength inside or outside the spectrum.

In various embodiments employing FM, the local oscillator 32 has a frequency higher than one of the states. In various AM and/or FM embodiments, the local oscillator frequency-offset dF is greater than the bandwidth of the opto-electrical converter, when the opto-electrical converter is determined based on the expected signal bandwidth. For example, the local oscillator frequency-offset dF may selected to be between 1 and 1.5 times the bandwidth of the opto-electrical converter and/or the electrical rectifier.

The local oscillator frequency-offset, or frequency difference dF, may be controlled at a desired value by monitoring and tuning the local oscillator frequency in such a way that maintain the desired oscillator frequency-offset. For example, the local oscillator may be tuned by isolating specific frequency components of the electrical signals after the rectifier and low-pass filter, and tuning the local oscillator frequency in such a way that these specific frequency components are maximized. Optimum performance may be achieved with this measure by isolating the desired frequency component and using it as a control signal for the local oscillator tuning system. This can e.g., be done by filtering.

Notably, the present invention enables the tracking of the LO frequency with the signal without locking the phase or frequencies of LO light and signal via phase-locked loops (PLL) or other conventional techniques for locking the LO light and signal. Rather, the frequency offset between the LO light and the optical signal or the LO light position relative to frequency in the wavelength channel may be controlled. In addition, the system may operate by tuning the LO, not by tuning the signal, which may be paramount in various applications.

Figure 9:
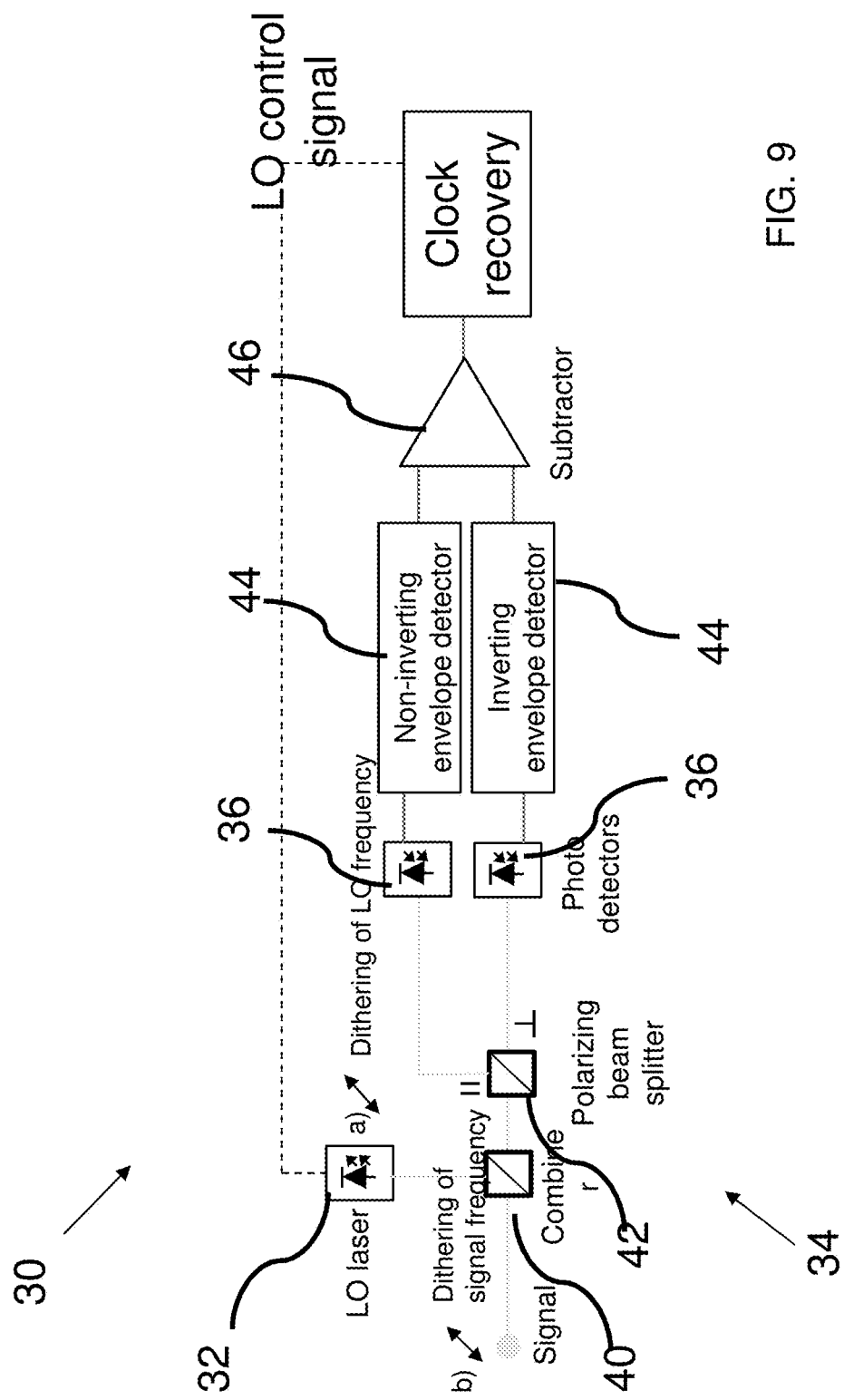
Figure 10:
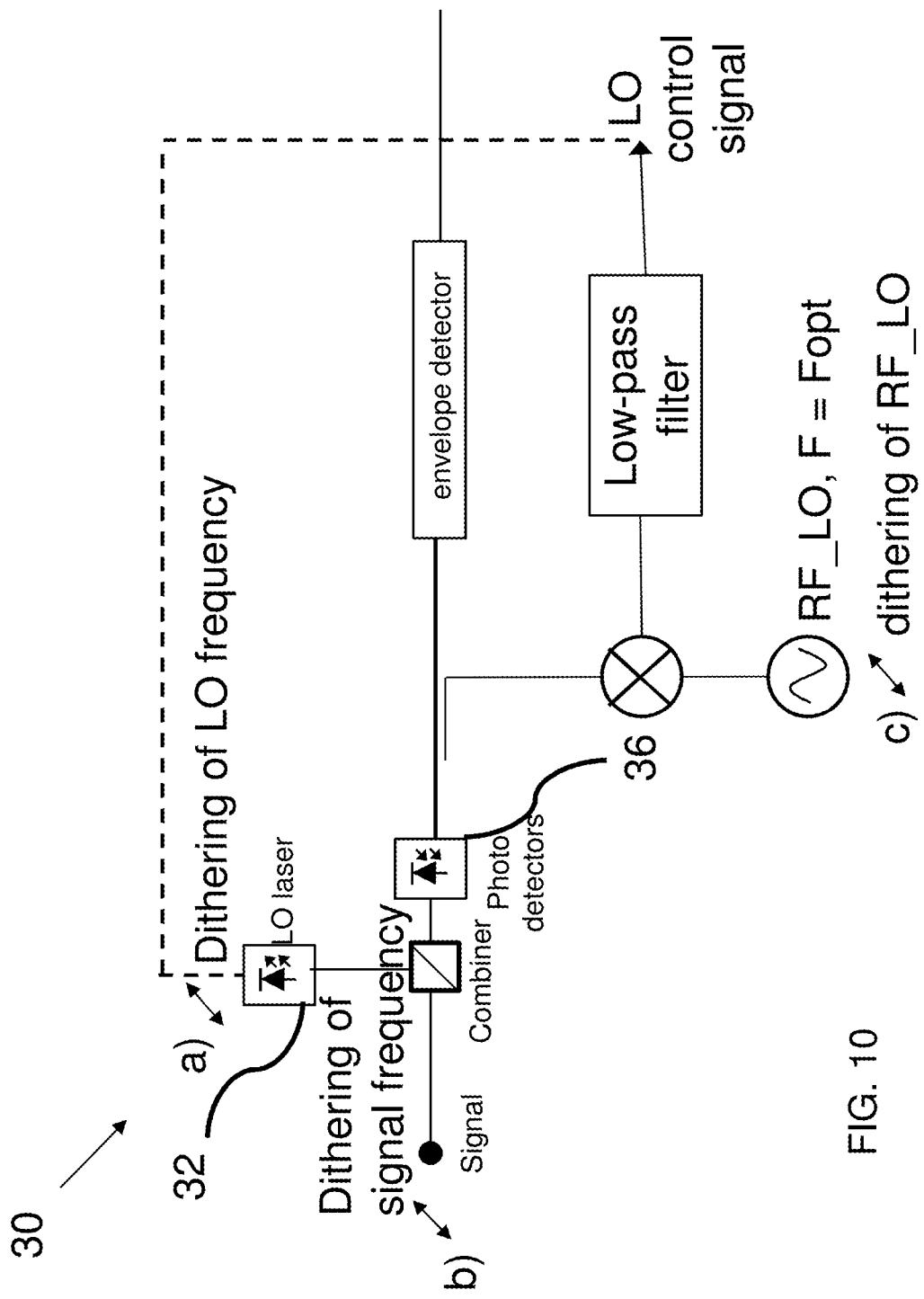

FIGS. 9 and 10 show various embodiments of the optical receiver 30, in which dithering may be applied to signal to enable tracking and control of the LO light frequency. The dithering may be applied to the LO light and/or the incoming optical signal and extracted from a clock recovery circuit 46 and/or using a RF local oscillator operating at or near the desired LO offset frequency from the signal.

In FIG. 9 embodiments, a tap of the recovered clock may be used to provide the control signal for the LO 32. By applying a dithering signal to the LO bias and/or temperature control, the corresponding change in the power of the LO control signal (i.e. the recovered clock) will identify, if the LO needs to be tuned up or down or if it is at an optimum.

In FIG. 10 embodiments, a tap of the received signal after the OE converter 36 may be mixed electrically with an RF tone at a frequency Fopt corresponding to the desired "target" frequency offset dF between the signal and the LO laser light. The output of the mixer will be a signal centered at the intermediate frequency Fi between the instantaneous dF and Fopt. In the optimum of dF=Fopt, the signal after mixing will be a baseband signal with a strong DC term. After the mixer, a low-pass filter with a cutoff frequency equal to the desired tolerance of dF (e.g. a 1 GHz low-pass filter if a tolerance of +/? 1 GHz can be accepted on dF), a simple power, voltage or current detector will provide a control signal that can be used to control the LO frequency for optimum dF. By applying a dithering signal to the LO bias and/or temperature control, the corresponding change in the power of the LO control signal will identify if the LO needs to by tuned up or down or if it is at an optimum.

Potential other variants of the LO tuning system also include:
 a) using the DC current or voltage at the envelope detector,
 b) integrating the power in a frequency band from DC and up to a frequency below the symbol rate of the signal. The upper frequency of this integration is chosen in such a way as to maximize the correlation between the detected signals eye-opening and the power in the integrated frequency band, and
 c) choosing the narrow frequency peak at the symbol rate of the signal. If a clock recovery system is used, the recovered clock can be used as the control signal.

The LO tuning system may be used dynamically to track and adjust LO signal frequency following a slowly (nanoseconds to years) varying optical signal frequency by use of one or more of the three above variants for monitoring and altering the LO frequency including alteration of bias current, temperature, or other laser wavelength alteration techniques.

The tracking may be continuous or happening in periodically, such as specific timeslots. In various implementations, dynamic tracking is use compensate for signal laser frequency swing (chirp) in time-domain multiplex (TDM) communications in which laser chirp occur due to off/on operation.

In another implementation of the invention the tracking system is used to compensate for changes in signal laser frequency/wavelength due to aging or fluctuations in bias current or temperature.

A third implementation of the invention, the tracking system is used to control channel switching time in a reconfigurable WDM system.

A fourth implementation of the invention involves tracking the signal frequency/wavelength within a predetermined optical frequency/wavelength range specified as the channel wavelength window in a WDM system.

Figure 11:
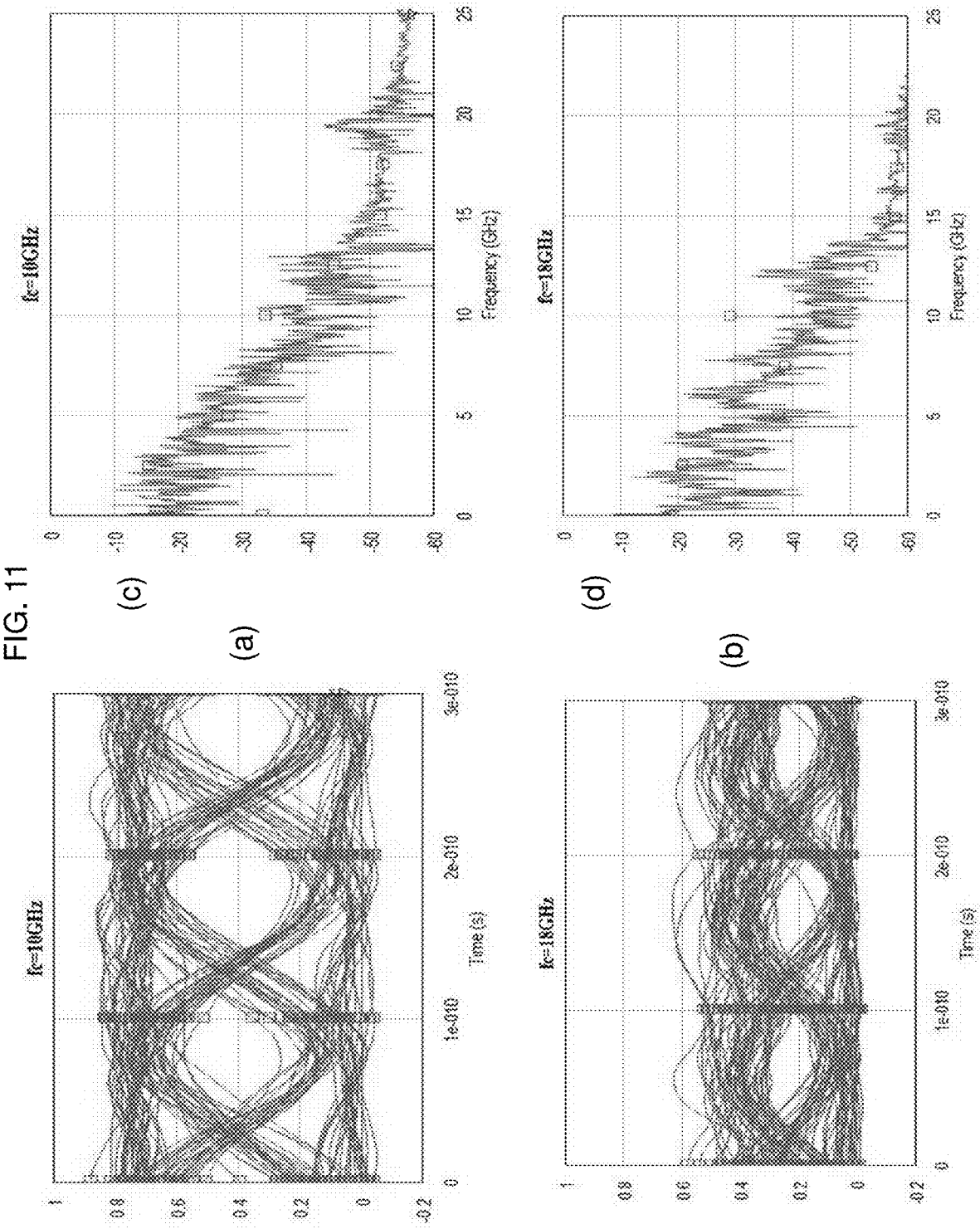

FIG. 11 shows examples of eye diagram (a-b) and power spectrum (c-d) after the down-conversion system, implemented as an envelope detector (described below), for a 10 Gbps non-return-to-zero on-off-keying optical signal detected by a receiver amplifier through optical beating in the photodetectors using LO light at frequency chosen in such a way that dF equals 10 GHz and 18 GHz respectively. Power going into the envelope detector (down-conversion system) is the same in the two cases. It is evident that the eye-diagram is more open, and thus that the original data has been better recovered for Fc=10 GHz. Comparing the two spectra, it is seen that there is more content below 5 GHz for Fc=10 GHz. It can thus be seen that the power at low frequencies can be used directly as an indicator for optimum LO tuning.

In various embodiments, the optical to electrical converters 36 may be implemented as photodiodes (PD) to convert the first and second combined optical signals into first and second electrical signals. In various embodiments, the PD 36 and electrical processing unit 38 have an associated operating bandwidth that may be matched to be approximately equal to or greater than the bandwidth of the incoming optical signal. For example, in various single channel or WDM systems 10, the PD 36 bandwidth and electrical processing unit 38 may be set at 1.5 to 2 times the optical signal bandwidth.

In various embodiments, the optical receivers may be wavelength channel receivers, in which the electro-optic converter 36 and electrical processing units 38 may have a bandwidth that is defined, or set, based on the bandwidth of the wavelength channels in the system 10 and not signal bandwidth. The wavelength channel often being substantially greater than the signal bandwidth being detected. Such wavelength channel receiver embodiments are particularly useful in system 10 employing transmitters without frequency control of the optical source and/or TWDM system configurations that employ one optical receiver, such as in an OLT 12, to receive optical signals from multiple transmitters in multiple ONUs. For example, in a system 10 having a 50 GHz wavelength channel grid, the bandwidth of the OE converter and electrical processing unit 38 may be 40 GHz, even though the bandwidth of the optical signal is significantly lower, e.g., an NRZ encoded optical signal of bit rate 2.5 Gbps, 10 Gbps, 25 Gbps, or any other optical signal that is contained within the bandwidth of the allocated wavelength channel. In various single channel and WDM systems, the wavelength channel receiver bandwidth may be defined based on the wavelength channel bandwidth and substantially similar to the wavelength channel bandwidth, e.g. approximately 40 GHz receiver bandwidth on a 40-50 GHz grid, or it may be a different bandwidth based on the wavelength channel, e.g., 40 GHz receiver for 10 Gbps signals on a 100 GHz wavelength channel grid.

In such embodiments, the LO may have a fixed frequency defined by the allocated wavelength channel, i.e., the bandwidth of the channel as defined in the system, and not by the signal. The signal may move within the allocated wavelength channel, while the LO remains generally fixed frequency either generally proximate the high frequency channel boundary or the low frequency channel boundary in or near the guard band.

Figure 12:
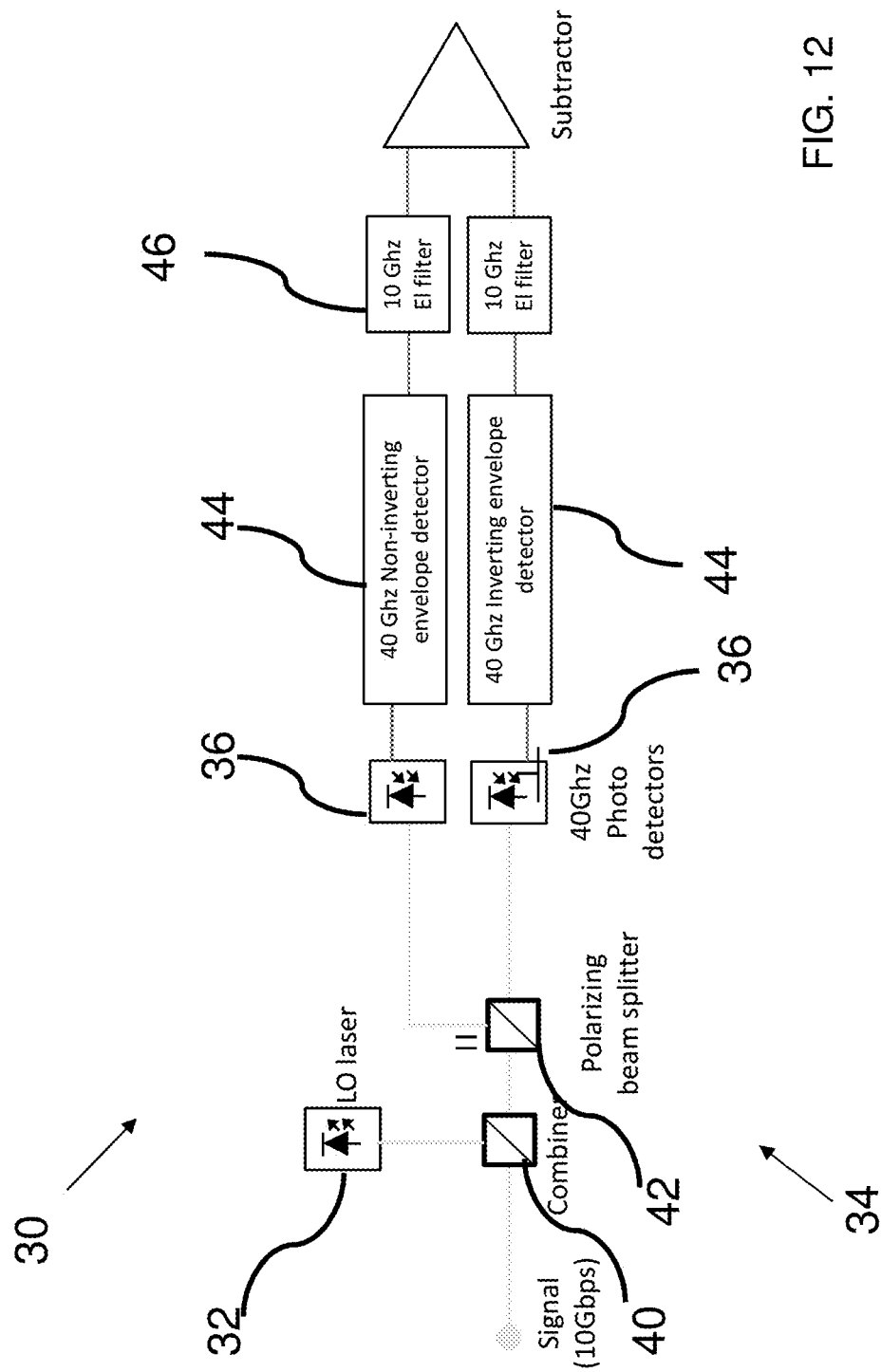

FIG. 12 shows various optical receiver 30 embodiments in which the OE converter 36 and electrical processing unit 38 for a 10 Gbps (NRZ) bit rate may be implemented with a 40 GHz bandwidth. The OE converter 36 bandwidth may be referred to as the channel bandwidth of the receiver. The optical signal frequency may be anywhere within the allocated wavelength channel, which allows for variation due signal bit rate and bandwidth, chirp, and drift due to aging and temperature variation and transmitter to transmitter variations in TDM, WDM, and TWDM systems.

Figure 13:
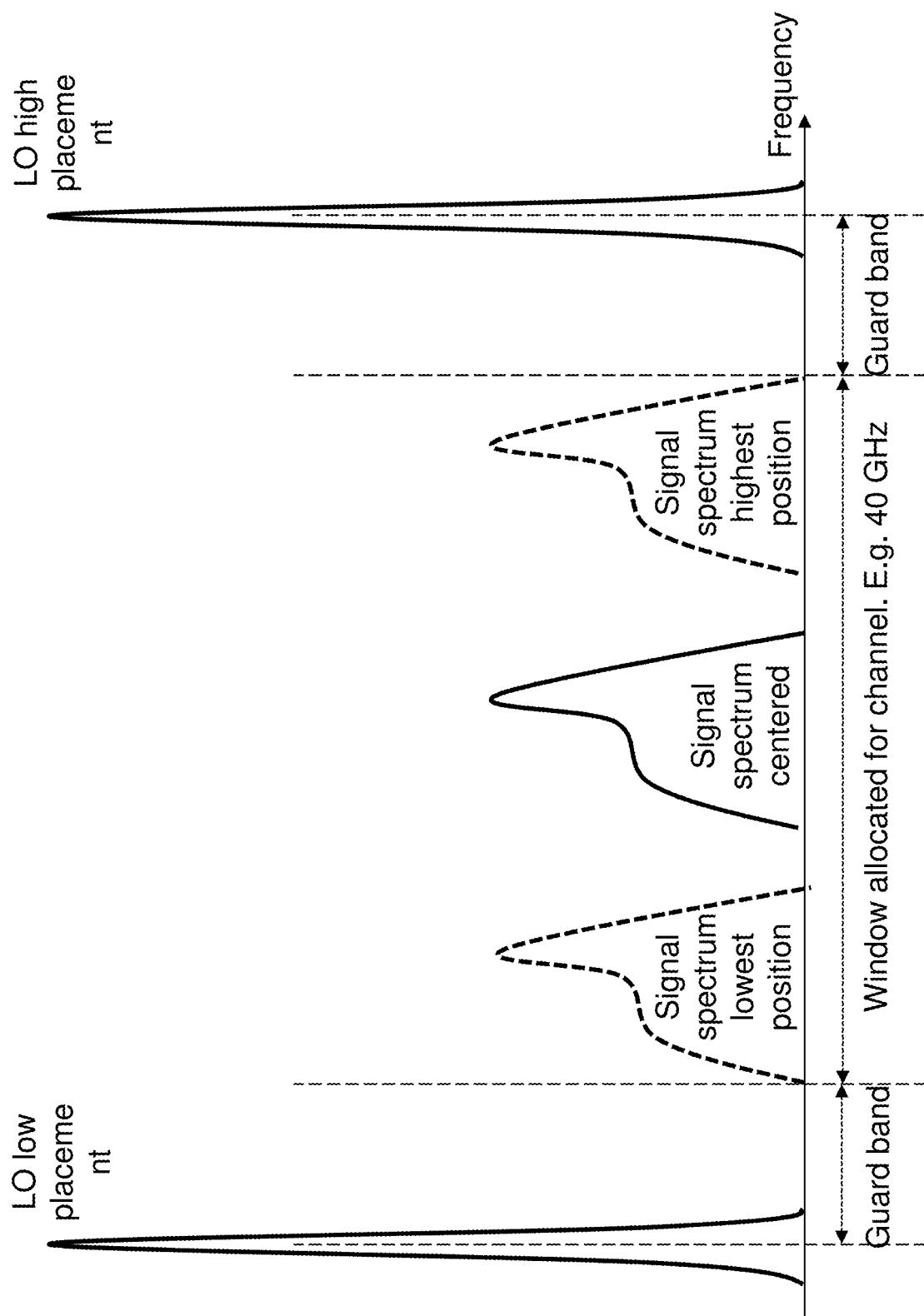
FIG. 13 shows exemplary signal spectrum and LO positions with a channel window of a wavelength channel in a system.

FIG. 13 shows exemplary wavelength positions of optical signal within the range of wavelengths in the wavelength channel. While the center frequency of the optical signal may vary significantly within the wavelength channel, the LO frequency may remain generally fixed near the edge of the channel in or near the guard band. In various embodiments, it may be desirable to vary the LO frequency.

For systems 10 where a specific wavelength or frequency channel window is allocated for the optical signal, a wideband opto-electric converter may be used to accommodate signals of various center frequency without detuning the LO. In various embodiments, LO-signal frequency offset is not uniquely defined, such as with respect to the signal, but may be defined with respect to the wavelength channel window. As further shown in FIG. 13, the channel window boundaries are illustrated with the signal in 3 different positions within. While the illustrated signal depicts a combined AM/FM signal, the description is equally applicable to pure AM or pure FM signals. In these embodiments, the LO is fixed in a position just outside the edge of the channel bandwidth, and may be placed on either the high frequency or the low frequency side. For combined AM/FM signals, it may be more preferable to place the LO frequency towards the highest amplitude frequency components of the signal.

Optimum placement of the LO frequency may be at a frequency offset from the channel window edges. This offset, or guard band, is preferable slightly narrower to the signal bandwidth. For the case where the LO power is significantly higher than the signal, one may prefer to avoid the guard band and place the LO very close to the edge of the channel window.

The local oscillator frequency may be controlled to maintain a set LO frequency offset or within an offset range, or it may be locked relative to one of edge of the wavelength channel, such as by using a wavelength locker. The optical beating of the local oscillator and the signal may result in a beating product generated by the opto-electrical converter. This beating product will be positioned at a frequency between baseband and an upper frequency limit equal to the bandwidth of defined wavelength channel. While the combined bandwidth (channel bandwidth) of the electrical signal being provided to the electrical processing unit 38 may be much larger than the signal bandwidth, the noise bandwidth may be managed through the use of electrical low pass filters that are nominally matched (the same or similar bandwidth) to the signal bandwidth and/or threshold detection/decision circuit to reduce the noise across the channel. Hence, electrical signal-to-noise ratio may not be deteriorated by the accumulated noise resulting from a receiver bandwidth that is much larger than the signal. It will be appreciated that the low pass filter may be provided before (FIG. 12) or after the combiner.

Figure 14:
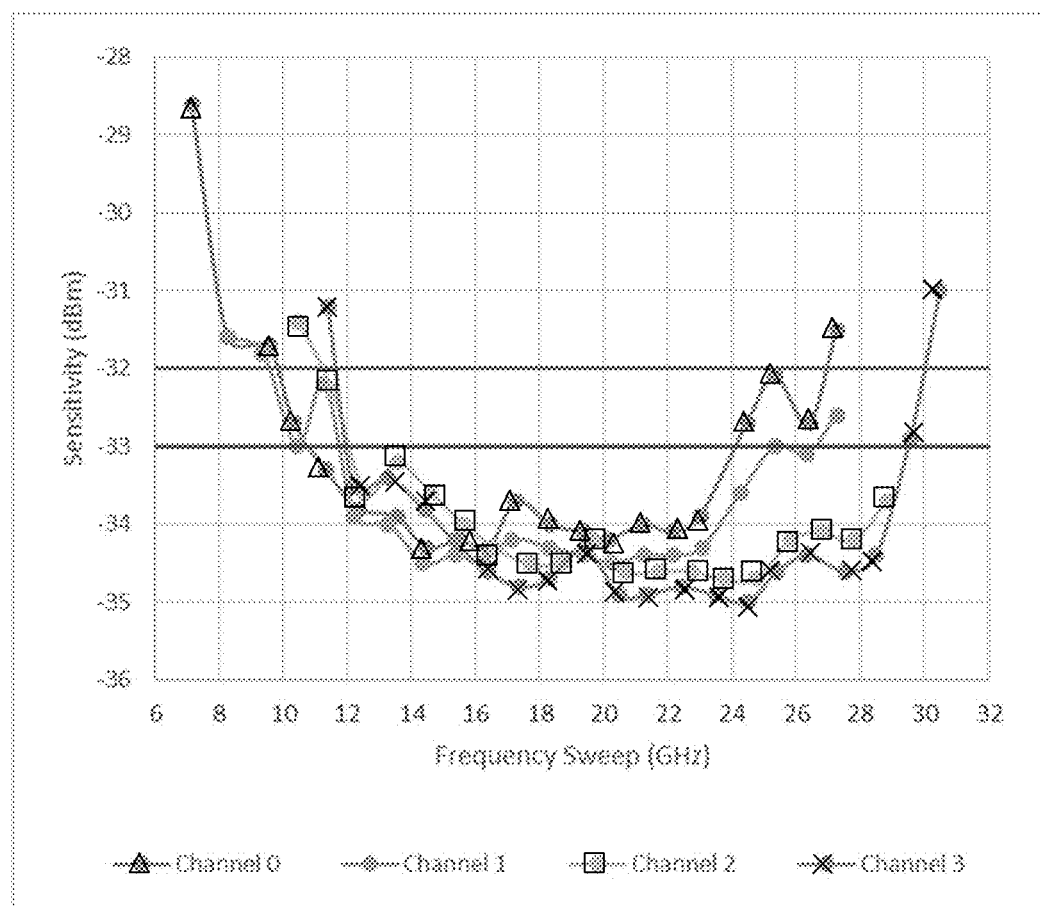

FIG. 14 demonstrates the reception of 4×10 Gbps signals using a single optical receiver in which each of the four different wavelength channels are selected only by tuning the optical frequency of the LO. The wavelength channel bandwidth reception is in this case illustrated by fine-tuning the LO over each wavelength channel rather than tuning the signal wavelength, which could not be done as these were commercially available transmitters (NG-PON2 ONU compliant) for operation on a 100 GHz grid. The 3-dB bandwidth (BW) is approximately 20 GHz, which gives a wavelength channel window bandwidth of approx. 30-35 Ghz including the signal BW (signal is cut off as it approached the edge of the channel window.

In various systems 10, such as TWDM PON (NG-PON2 and others), there may be a specified channel wavelength window for each wavelength channel. Stray signal outside the window may be cut off and may interrupt adjacent WDM channels. The broader bandwidth of the OE converter 36 in wavelength channel receiver embodiments addresses several challenges in these systems. For example, in various system implementations, for upstream transmissions from multiple subscribers (ONU—optical network unit) to central office (OLT—optical line termination), each ONU is given a specific time slot to transmit. This creates the following challenges: a) each ONU transmitter may have slightly different center frequencies/wavelengths. b) the off/on turn-on also called burst-mode of the ONU transmitter can cause frequency chirp, c) aging and operation conditions optical sources in each ONU may cause the signal frequency/wavelength to vary over time. Performance wise, as long as each ONU transmits wavelength stays within the channel window, the OLT is expected to receive it.

In various embodiments, the electrical signal processor 38 may include a rectifier 48 and combiner 50. Rectification may be applied digitally or analogically. Using a rectifier may provide reduced computational complexity and/or hardware and accordingly the overall cost. For example, the rectifier may be used without an analog/digital (A/D) converter. Another advantage of the present invention is thus the ability to eliminate the need of analog/digital (A/D) converters. Rectification may be performed as half-wave rectification such that either the positive or negative part of the signal is removed. Half-wave rectification may be possible with a gate with a non-linear transfer function. A gate may be biased such that the e.g., negative part of the signal is lower than the threshold of the gate. Rectification may also be performed as full-wave rectification such as a squaring element, where all negative values are converted to positive values. As described, rectification may be squaring. This may be implemented in hardware or software. In the case, where implemented in software, an analogue/digital converter may be implemented before processed in a digital signal processer (DSP). An alternative to squaring may be obtained by Hilbert transforming the signal. Various other solutions may however be possible. Examples of analogue rectifiers include XOR gates, and diode bridges. Both the XOR gates and the diode bridges allow for real-time signal processing without DSP, and may thus be preferred over a DSP.

As shown in FIGS. 4, 9, and 10, the rectifiers 48 may be implemented as envelope detectors 48. A first envelope detector/rectifier 48A converts the first electrical signal from one of the photodiodes to a non-inverted non-return-to-zero (NRZ) data signal. A second envelope detector/rectifier 48B converts the second electrical signal from the other photodiode to an inverted NRZ data signal. The inverted and non-inverted electrical signals are combined to provide the electrical data signal. The combiner 50 may be a differential amplifier that performs a subtraction to recombine the signal.

By combining the signals after the envelope detectors (i.e., in baseband rather than RF), the relative optical phase between the signals in the two arm becomes non-important. If the signals were combined after the PD, but before the envelope detector, the phase of the optical signals in the two arm would need to be matched.

By configuring one (and only one) of the envelope detectors in such a way that it inverts the output NRZ signal, the two arms can be combined without loss by subtracting them from each other, e.g., in a differential amplifier. If both arms were either inverting or non-inverting, and a resistive power combiner or other adding circuit may be used to combine the signals.

The combined electrical signal may then be further processed by the optical receiver 30 and/or further transmitted in or out of the system 10.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware, firmware, and/or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Various elements of the system may employ various levels of photonic, electrical, and mechanical integration. Multiple functions may be integrated on one or more modules or line cards being housed in one or more shelves or racks in the system 10.

Hardware processor modules may range, for example, from general-purpose processors and CPUs to field programmable gate arrays (FPGAs) to application specific integrated circuit (ASICs). Software modules (executed on hardware) may be expressed in a variety of software languages (e.g., computer code), including C, C++, Java™, Javascript, Rust, Go, Scala, Ruby, Visual Basic™, FORTRAN, Haskell, Erlang, and/or other object-oriented, procedural, or other programming language and development tools. Computer code may include micro-code or microinstructions, machine instructions, such as produced by a compiler, code used to produce a web service, and files containing higher-level instructions that are executed by a computer using an interpreter and employ control signals, encrypted code, and compressed code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more. Furthermore, as used herein, the term "set" is intended to include one or more items, and may be used interchangeably with "one or more. Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The presence or absence of a summary, abstract, or claims in this application should in no way be considered as limiting on the scope of any inventions disclosed herein.

What is claimed is:

1. An optical communication system comprising
an optical transmitter to transmit an optical signal carrying data having a signal bandwidth; and
an optical receiver to receive the optical signal, and including
   at least one local oscillator laser providing local oscillator light at a local oscillator frequency,
   a combiner to couple the optical signal with the local oscillator light into a coupled optical,
   a splitter to split the coupled optical signal into first and second coupled optical signals having orthogonal polarizations,
   two opto-electrical converters to convert first and second coupled signals into respective first and second electrical signals,
   first and second transimpedance amplifiers to amplify the first and second electrical signals, respectively,
   a first rectifier to rectify the first electrical signal into an inverted data signal;
   a second rectifier to rectify the second electrical signal into a noninverted data signal; and
   a combiner to subtract the inverted data signal and the non-inverted data signals to provide an electrical data signal.

2. The system of claim 1, where,
the optical transmitter is one of a plurality of optical transmitters, each transmitting optical signals having a signal spectrum and a center frequency and a bit rate in a wavelength channel having a channel bandwidth; and
the optical receiver having a receiver bandwidth defined relative to wavelength channel bandwidth to receive the optical signals from each of the plurality of optical transmitters.

3. The system of claim 1, where,
the two opto-electrical converters are photodiodes having a bandwidth substantial similar to the bandwidth of a wavelength channel in the system, and
the local oscillator frequency is located and fixed proximate to an edge of the wavelength channel.

4. The system of claim 1, where,
the optical receiver receives optical signals within a wavelength channel; and
the optical transmitter is one of a plurality of optical transmitters, each transmitting optical signals having a center frequency within the wavelength channel.

5. The system of claim 1, where,
the difference between the local oscillator frequency and the signal spectrum is less than the bandwidth of the two opto-electrical converters.

6. The system of claim 1, where,
the two opto-electrical converters and the first and second rectifiers have a 40 GHz bandwidth and the optical signal has a 10 Gbps bit rate signal.

7. The system of claim 1, where,
the two opto-electrical converters and the first and second rectifiers have a bandwidth and the local oscillator frequency is offset from the bandwidth of the two opto-electrical converters and the first and second rectifiers by between 1 and 1.5 times.

8. The system of claim 1, where,
the two opto-electrical converters and the first and second rectifiers have a bandwidth that is 1.5 to 2 times the optical signal bandwidth.

9. An optical receiver comprising
an optical local oscillator source,
an optical combiner having a first input and a second input, the second input optically coupled to the local oscillator laser,
an optical splitter having first and second outputs with orthogonal polarizations optically coupled to the first and second inputs of the optical combiner,
first and second opto-electrical converters optically coupled to the first and second outputs of the splitter respectively,
an inverting rectifier electrically coupled to the first opto-electrical converter and having an output;
a non-inverting rectifier electrically coupled to the second opto-electrical converter and having an output; and
an electrical combiner electrically coupled to subtract the output from the inverting rectifier from the output of the non-inverting rectifier.

10. The receiver of claim 9, where,
the optical local oscillator source includes at least one laser coupled to the optical combiner with polarization maintaining fiber,
the optical combiner and optical splitter are a polarization maintaining coupler,
the first and second opto-electrical converters are photodiodes, and
the inverting rectifier and the non-inverting rectifier are envelope detectors.

11. The receiver of claim 9, further comprising
a tap electrically coupled to at least one output of two first opto-electrical converters;
a RF local oscillator;
a RF mixer having inputs electrically coupled to the tap and the RF local oscillator and an output; and
a low-pass filter having an input coupled to the output of the mixer and an output electrically coupled to the local oscillator source.

12. The receiver of claim 9, further comprising
a clock and data recovery circuit having an input coupled to the electrical combiner and an output coupled to the local oscillator source.

13. The receiver of claim 9, where
the electrical combiner is a subtractor.

14. The receiver of claim 9, where
the electrical combiner is a differential amplifier.

15. The receiver of claim 9, where,
the first and second opto-electrical converters and the inverting and non-inverting rectifiers have a bandwidth and the local oscillator source emits light at a frequency offset from the bandwidth of the first and second opto-electrical converters and the inverting and non-inverting rectifiers by between 1 and 1.5 times.

16. The receiver of claim 9, where,
the inverting and non-inverting rectifiers are envelope detectors.

17. The receiver of claim 9, where,
the inverting and non-inverting rectifiers are digital rectifiers.

18. The receiver of claim 9, where,
the electrical combiner combines the output from the inverting and non-inverting rectifiers without loss.

19. The receiver of claim 9, where,
the first input of the optical combiner is coupled to at least one optical transmitter.

* * * * *